United States Patent [19]
He et al.

[11] Patent Number: 5,957,045
[45] Date of Patent: Sep. 28, 1999

[54] MACHINE FOR PEELING VEGETABLES AND FRUITS

[75] Inventors: Shen Long He, Ningbo, China; Pierre Tardif, Longueuil, Canada

[73] Assignee: Les Promotions Atlantiques Inc., Longueeuil, Canada

[21] Appl. No.: 09/119,693

[22] Filed: Jul. 21, 1998

[30] Foreign Application Priority Data

Jul. 22, 1997 [CN] China ................................. 97 2 21971
Jan. 10, 1998 [CN] China ................................. 98 2 10859

[51] Int. Cl.$^6$ .............................. A23N 7/00; A47J 17/00; A47J 17/14; A47J 17/16
[52] U.S. Cl. ................................. 99/541; 99/590; 99/593; 99/594; 99/599
[58] Field of Search ............................ 99/539–541, 584, 99/588–599; 426/481–483

[56] References Cited

U.S. PATENT DOCUMENTS

| | | | |
|---|---|---|---|
| 16,080 | 11/1856 | Pratt | 99/590 |
| 242,660 | 6/1881 | Law | 99/598 |
| 430,139 | 6/1890 | Meyer | 99/598 |
| 633,932 | 9/1899 | Williamson | 99/598 |
| 836,140 | 11/1906 | Radsch | 99/598 |
| 1,006,621 | 10/1911 | Arnold | 99/590 X |
| 1,256,751 | 2/1918 | Wenzel | 99/598 |
| 2,130,980 | 9/1938 | Chattin et al. | 99/596 |
| 2,483,930 | 10/1949 | Pauls | 99/596 X |
| 3,152,436 | 10/1964 | Chesley | 99/594 X |
| 3,881,406 | 5/1975 | Perez | 99/541 X |
| 4,137,839 | 2/1979 | Couture et al. | |
| 4,287,820 | 9/1981 | Urban | 99/593 X |
| 5,097,758 | 3/1992 | Fresh | 99/590 |

OTHER PUBLICATIONS

Copy of the packaging of the product sold under the trademark Stripper by Dazey Corp., date unknown.

*Primary Examiner*—Timothy F. Simone
*Attorney, Agent, or Firm*—Darby & Darby

[57] ABSTRACT

The machine for peeling vegetables and fruits has a hollow base. A vertical pole projects upwardly from the hollow base. A threaded rod extends vertically within the vertical pole and is driven into rotation by a handle. The vegetable or fruit to be peeled is held between a support pin rod having one end slidably mounted onto the vertical pole and a remove end which is located at a distance away from the vertical pole, and a support axle rotatably mounted about a vertical axis on top of the hollow base. A set of gears is mounted within the hollow base and connected to the bottom end of the threaded rod and to the support axle so as to drive the support axle into rotation when the handle is rotated. A cutting/peeling mechanism is provided, which includes a stand cover slidably mounted on the vertical pole, a manually operable clutch that is mounted on the stand cover to connect the same to the threaded rod, a blade supporting rod that is also mounted on the stand cover and urged by a spring toward the vegetable or fruit to be peeled, and a cutting/peeling device that is detachably mounted into a hole at the remote end of the blade supporting rod. This machine for peeling vegetables and fruits is economic, highly effective and easy to operate. It saves time, offers full functions, and is suitable for camping, household, restaurants and hotels.

20 Claims, 9 Drawing Sheets

MACHINE FOR PEELING VEGETABLES AND FRUITS

BACKGROUND OF THE INVENTION

1. Field of the Invention

The invention relates to a machine for peeling vegetables and fruits such as, by way of non-restrictive examples, potatoes, radishes, beets, turnips, apples, pears and the like.

2. Brief Description of the Prior Art

In order to meet the rapid rhythm of live, different types of kitchen appliances have been invented to save time and energy, and they have gained wide acceptance.

Amongst these kitchen appliances, machines for peeling vegetables and/or fruits have been developed. Examples of such machines are disclosed, by way of examples, in U.S. Pat. Nos. 430,139, 633,932, 2,415,249 and U.S. Pat. No. 3,881,406. These known machines are efficient. However, they have some difficulties in peeling vegetables or fruits with irregular surfaces. Indeed, their cutting blade do not always closely follow irregular contours and/or they go to deep in the vegetables or fruits thereby resulting in unpeeled areas and/or waste of valuable parts of the vegetables or fruits.

U.S. Pat. No. 4,137,839 discloses an improved machine for peeling vegetables and fruits, which includes a cutting head which closely follows the contour of the vegetable or the fruit to be peeled. The machine is equipped with a motor and can only work when connected to a source of electric power. The cutting head of this machine is not interchangeable and it is not adapted to every type of vegetable or fruit to be peeled.

Therefore, there is presently a need for an economic, highly efficient machine for peeling vegetables and fruits, which would be operable by hand and would have a blade mounted on a cutting/peeling device easy to interchange whenever needed, to adapt to all types and/or sizes of vegetables and fruits.

OBJECT AND SUMMARY OF THE INVENTION

It is the object of the present invention to provide such a efficient machine for peeling vegetables and fruits, which is operable by means of a handle and which comprises a cutting/peeling device easy to remove and to replace by a substitute device adapted to the type and size of the vegetable or fruit to be peeled.

In accordance with the invention, this object is achieved with a machine comprising a hollow base. A vertical pole is fixed to and projects upwardly from the hollow base. The vertical pole has a top end with a cover connected thereto, a side wall with a vertical slot made in it, and a bottom end. A threaded rod extends vertically within the vertical pole. The rod has an upper end passing through a hole made in the cover and a bottom end extending within the base.

A handle is provided for driving the threaded rod into rotation. The handle comprises a pole cork that is positioned on top of the cover and is connected to the upper end of the threaded rod. It also comprises a handle rod that is connected to and projects laterally away from the pole cork. The handle rod has a remote end, and a handle knob with a base freely mounted for rotation about a vertical axis at the remote end of the handle rod.

A support pin rod and a support axle are provided to hold the vegetable or fruit to be peeled. The support pin rod has one end slidably mounted onto the vertical pole and a remove end which is located at a distance away from the vertical pole and from which a pin projects downwardly to engage a vegetable or fruit to be peeled. The support pin rod is slidably movable in a vertical plane along the vertical pole. The support axle is rotatably mounted about a vertical axis on top of the hollow base at substantially the same distance away from the vertical pole as the remote end of the support pin rod in such a manner that the remote end of the support pin rod and the support axle are substantially aligned vertically. The support axle has an upper surface from which a plurality of insert pins upwardly project to engage and support the fruit or vegetable to be peeled.

A set of gears is mounted within the hollow base and connected to the bottom end of the threaded rod and to the support axle so as to drive the support axle into rotation when the handle is rotated.

A cutting/peeling mechanism is provided, which comprises a stand cover being in the form of an external ring slidably mounted onto the vertical pole and a clutch device including a manually operable clutch arm pivotally mounted on the stand cover about a vertical axis. The clutch arm passes through the vertical slot of the vertical pole and has one threaded end which is located within the vertical pole and which is operatively engageable with the threaded rod and another end projected outwardly from the vertical pole. This other end acting as a clutch actuating button. A spring permanently urges the one threaded end of the clutch arm towards the threaded rod.

The cutting/peeling mechanism further comprises a blade supporting rod externally and pivotally mounted about another vertical axis on the stand cover. The knife supporting rod projects laterally away from the cover and has a remote end extending at substantially the same distance away from the vertical pole as the remote end of the support pin rod, and an opposite end acting as disengaging button.

A cutting/peeling device is detachably mounted into a axial hole made in the remote end of the blade supporting rod. This device includes a vertical blade pivotally mounted about a vertical axis in such a manner as to contact the fruit or vegetables to be peeled. Another spring urges the blade supporting rod towards the vegetable or fruit to be peeled so that the blade at the remote end of said blade supporting rod may engage said vegetable or fruit and peel the same while moving up or down.

As may now be understood, the machine according to the invention is operable by hand. It is very simple in structure and operation, and "friendly user". It is highly effective, it saves time and its offers full functions, thereby making it useful for camping, household, restaurants and hotels. Its cutting/peeling device is detachable and easily replaceable by a substitute device having a different blade, which can be stored into a compartment provided for this purpose in the hollow base. This makes the machine easily adaptable to any kind or size of fruit or vegetable, as the user has only to select and use the proper device for optimum peeling efficiency.

The invention and its numerous advantages will be better understood upon reading the following non-restrictive description of a preferred embodiment thereof, made with reference to the accompanying drawings.

DESCRIPTION OF A PREFERRED EMBODIMENT OF THE INVENTION

Figure 1:
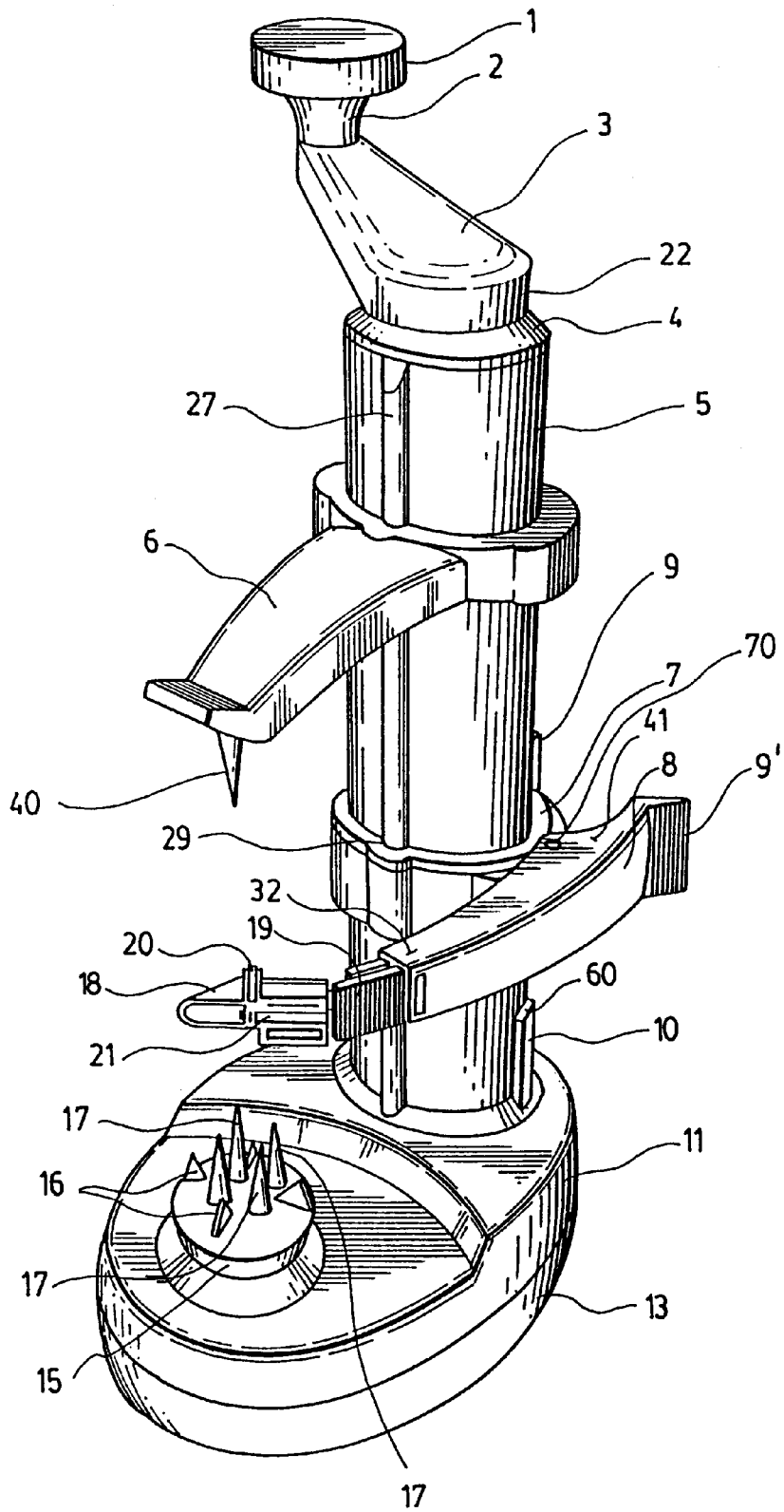
FIG. 1 is a top perspective view of a machine for peeling vegetables and fruits according to a preferred embodiment of the invention.
Figure 2:
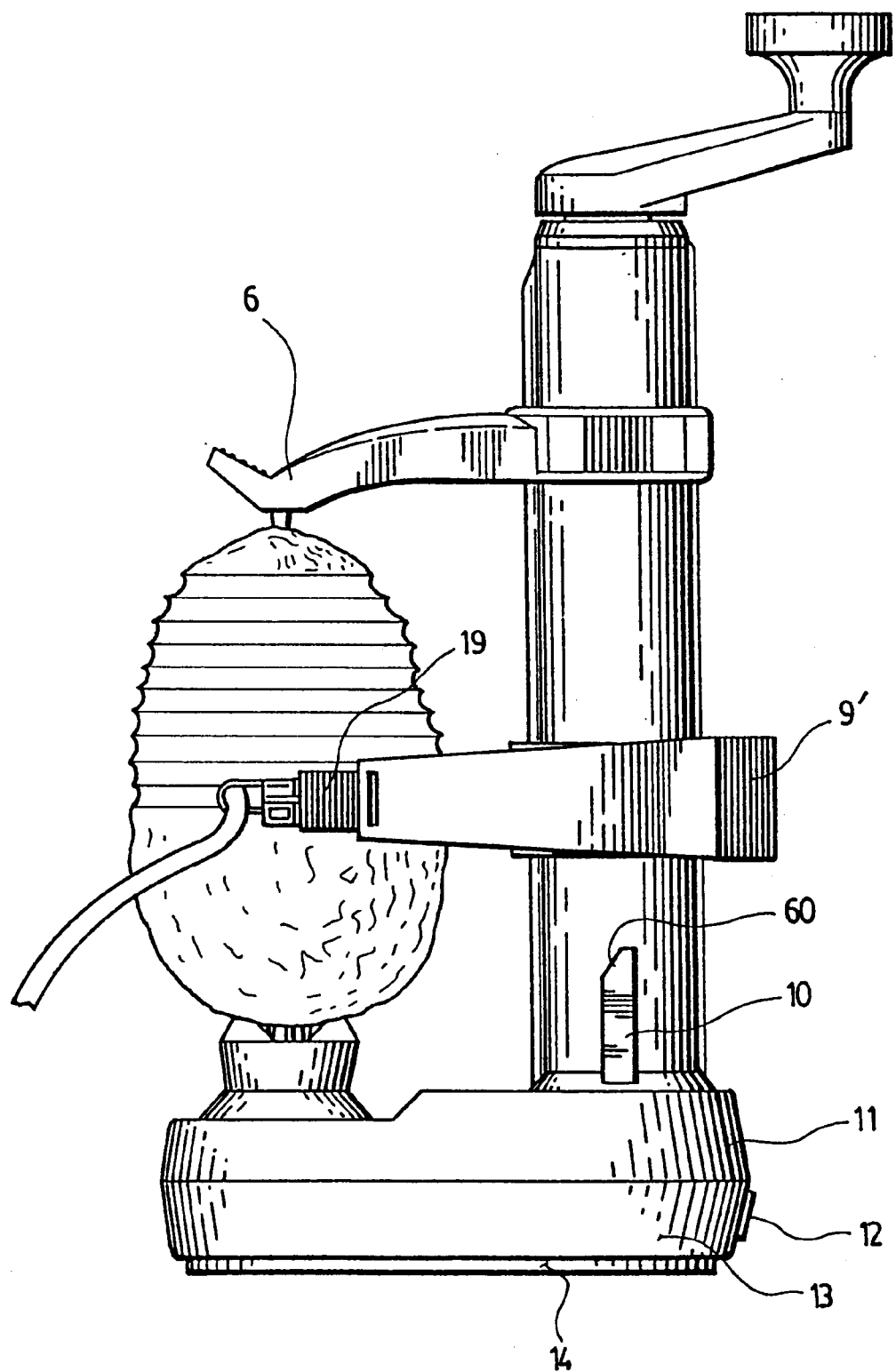
FIG. 2 is a right side elevational view of the machine shown in FIG. 1.

The machine for peeling vegetables and fruits according to the invention as shown in the accompanying drawings comprises a hollow base (13) of elongated shape, whose upper surface consists of a base cover (11) defining a front step and whose lower surface is provided with an anti-skid rubber pad (14)—see FIGS. 2 to 5.

A vertical pole (5) is fixed to and projects upwardly from the hollow base (13). The vertical pole (5) has a top end with a cover (4) connected thereto, a rear side wall with a vertical slot (30) made in it, and a bottom end rigidly connected to the base cover (11). It also has a front, outwardly projecting rib (27) which acts as a vertical guide as will be explained hereinafter.

Figure 3:
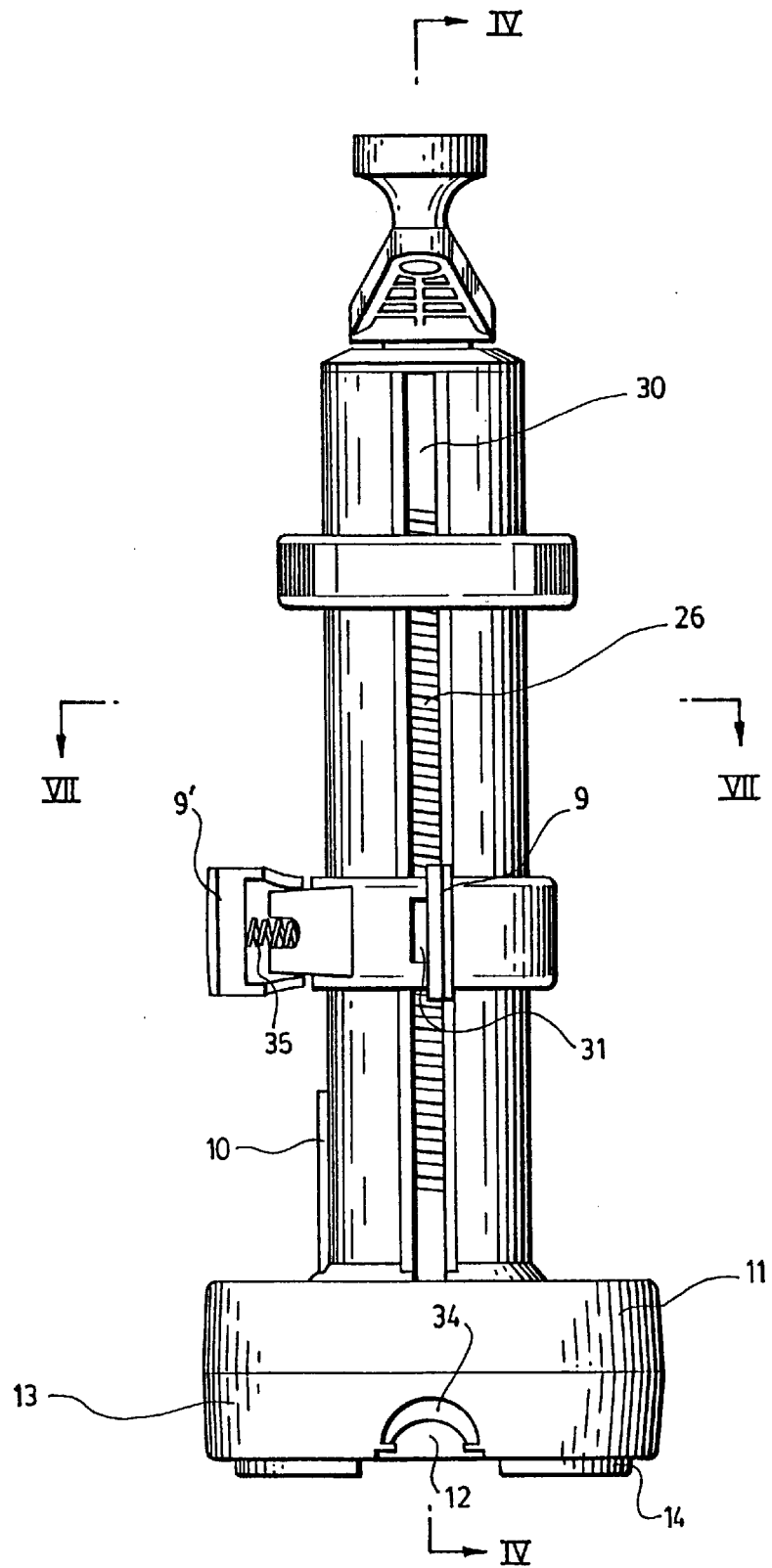
FIG. 3 is a rear elevational view thereof.
Figure 4:
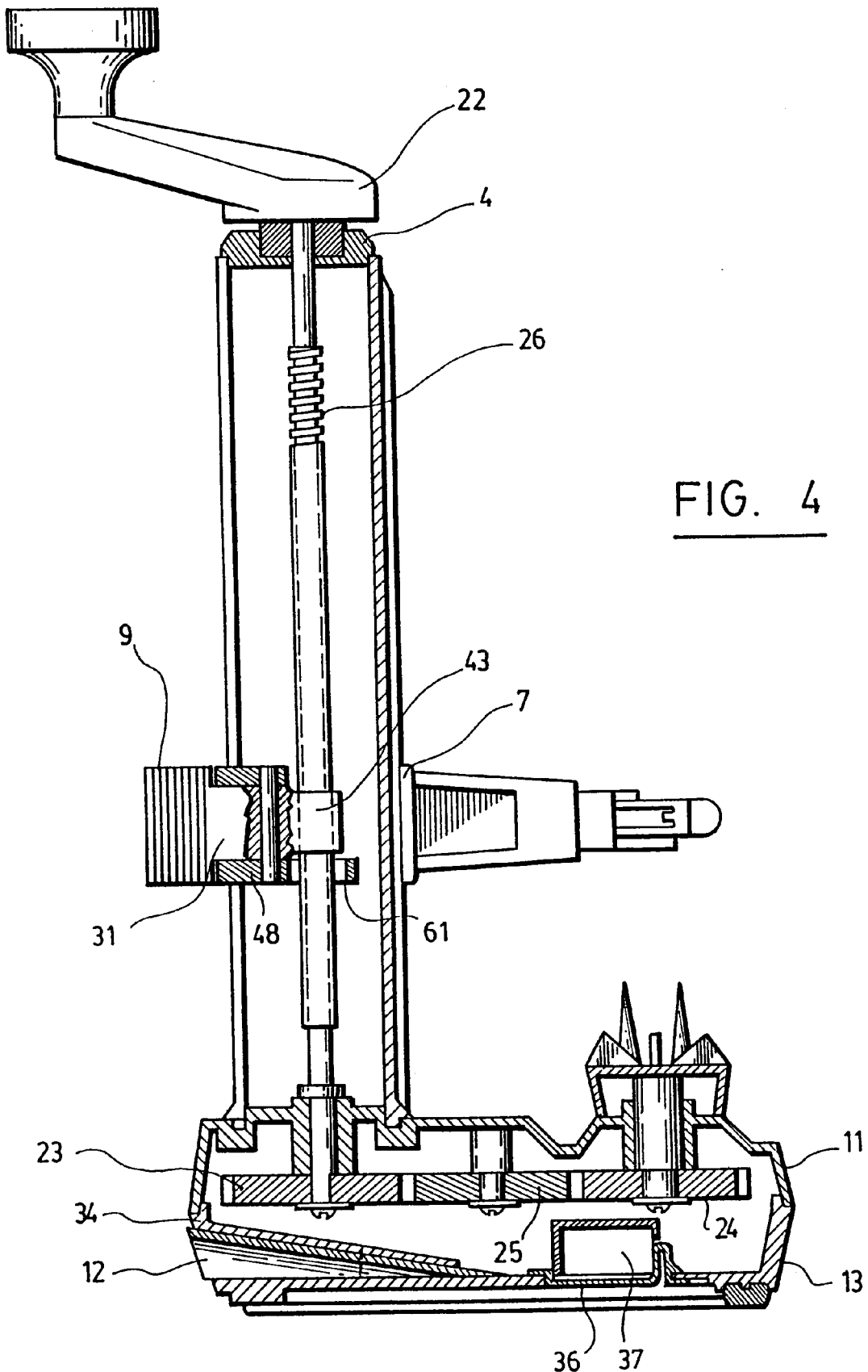
FIG. 4 is a side elevational cross-section view taken along line IV—IV of FIG. 3.

As is shown in FIGS. 3 and 4, a threaded rod (26) extends vertically within the vertical pole (5). This rod (26) has an upper end passing through a hole made in the cover (4) and a bottom end that passes through the base cover (11) and extends within the hollow base (13).

A handle (3) is provided for driving the threaded rod (26) into rotation. The handle comprises a pole cork (22) that is positioned on top of the cover (4) and is connected to the upper end of the threaded rod (26). It also comprises a handle rod that is connected to and projects laterally away from the pole cork (22). The handle rod has a remote end, and a handle knob (1) is freely mounted for rotation about a vertical axis at this remote end.

In order to hold the vegetable or fruit to be peeled, a support pin rod (6) is provided, which has one end in the form of an external ring slidably mounted onto the vertical pole (5). The support pin (6) projects forwardly above the front step of the base cover (11) and has a remote end which is located at a distance away from the vertical pole (5). A pin (40) of elongated conical shape projects downwardly from this remote end to engage the vegetable or fruit to be peeled. The support pin rod (6) is slidably movable with one hand in a vertical plane along the vertical pole (5) and always kept in aligned position thanks to the guiding rib (37).

A support axle (15) is rotatably mounted about a vertical axis on top of the front step of the base (13) at substantially the same distance away from the vertical pole (5) as the remote end of the supporting pin rod (6). As is clearly shown in the Figures, the remote end of the support pin rod (6) and the support axle (15) are aligned vertically. The support axle (15) is preferably cylindrical in shape and has an upper surface from which a plurality of insert pins upwardly project to engage and support the fruit or vegetable to be peeled.

Preferably, the insert pins on the upper surface of the support axle (15) include a set of central pins (17) and a set of external insert pins (16). As is shown, the pins of each set are equally spaced apart. The central pins (17) are of elongated conical shape while the external pins (16) are of triangular shape and extend in radial elongated planes with respect to the vertical axes of the support axle. As is also shown, the central and external pins are offset with respect to each other and are each four in number. As it can be understood, the positioning, shape and number of central and external pins could easily be modified without departing from the scope of the present invention, provided that they are able to hold the vegetable or fruit to be peeled in cooperation with the pin (40) of the support pin rod (6).

Figure 6:
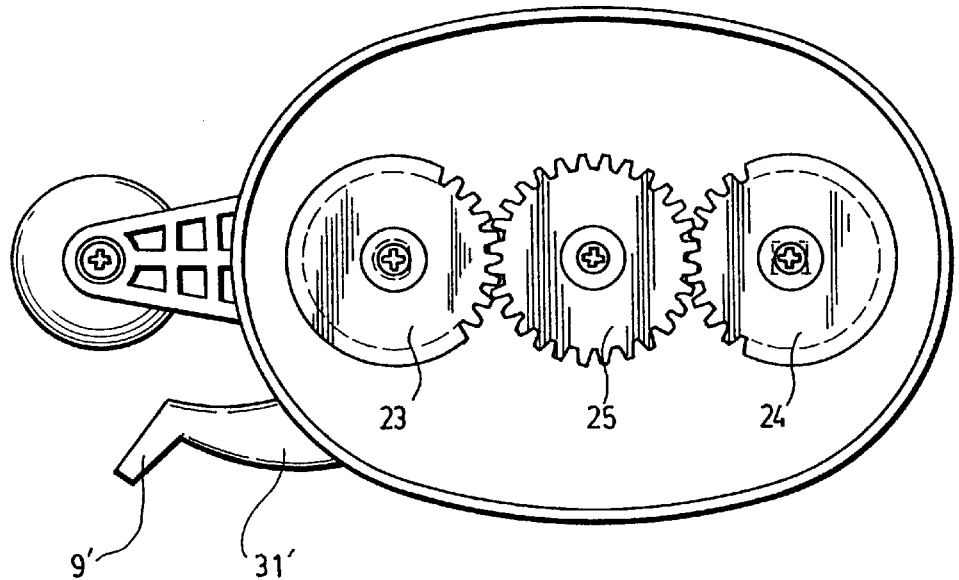
FIG. 6 is a bottom plan view with the bottom of the base removed.
Figure 7:
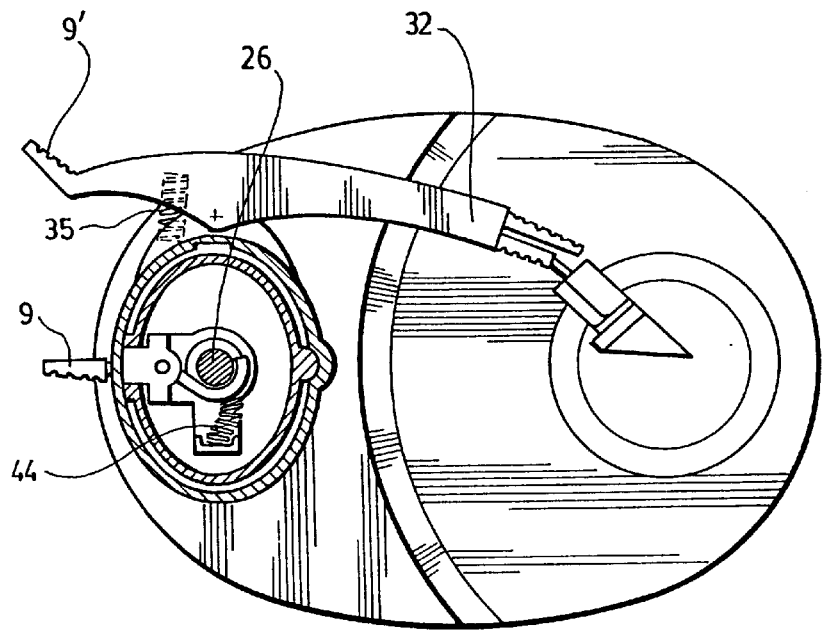
FIG. 7 is an horizontal cross-section view taken along line VII—VII of FIG. 3.

As is better shown in FIGS. 4 and 6, a set of gears (23), (24) and (25) is mounted within the hollow base (13). One of these gears (23) is connected to the bottom end of a threaded rod (26). Another gear (24) is connected to the bottom end of the support axle (15). The gears (23) and (24) are preferably connected to the bottom ends of the threaded rod (26) and support axle (15) by means of screws. However, any other kind of connecting means could be used. A middle gear (25) is mounted between the gears (23) and (24) in the same horizontal plane. The gear (25) is connected by a screw or any other means to a support provided in the base cover (11). The set of gears (23), (24) and (25) drives the support axle (15) into rotation when the handle is rotated. As can be understood, any other transmission means like a pair of teethed wheels and a chain could alternatively be used for the same purpose.

The machine according to the invention as shown in the accompanying figures further comprises a cutting/peeling mechanism which comprises a stand cover (7) in the form of an external ring that is slidably mounted onto the vertical pole (5) and guided by the rib (27).

The stand cover (7) comprises an internal ring (61) slidably mounted onto the threaded rod (26). The internal ring (61) is integrally connected to the external ring via a bridge (48) passing through the vertical slot (30) of the vertical pole (5).

A clutch device including a manually operable clutch arm (31) is pivotally mounted on the stand cover with a pin (52) extending in a hole having a vertical axis (50). The clutch arm (31) passes through the vertical slot (30) and has one semi-cylindrical end (45) with thread-forming grooves on it, which is located within the vertical pole (5) and is operatively engageable with the threaded rod (26). It also has another end projecting outwardly from the vertical pole (5). This other end acts as a clutch actuating button (9).

A spring (44) is provided for urging the one threaded end (45) of the clutch arm (31) towards the threaded rod (26). As can be understood, any other kind of urging means could be used provided that it has the same function. As is better shown in FIG. 8, a supporting finger (49) is provided to support the spring (44). This finger (49) is integrally connected to the internal ring. It extends within the vertical pole and supports the spring (44) with the pole (5) for permanently urging the one threaded end (45) of the clutch arm (31) towards the threaded rod (26), unless a pressure is exerted with a finger onto the clutch actuating button (9).

The cutting/peeling mechanism also comprises a blade supporting rod (8) externally and pivotally mounted about another vertical axis on the stand cover (7). This blade supporting rod (8) projects laterally away from the stand cover (7) and has a remote end (32) extending at substantially the same distance away from the vertical pole (5) as the remote end of the support pin rod (6). This remote end (32) has an axle hole (33). The blade supporting rod (8) also has an opposite end (9') acting as disengaging button.

A cutting/peeling device is detachably mounted into the hole (33) at the remote end (32) of the blade supporting rod (8). This device that will be described in greater detail hereinafter, includes a vertical blade (20) pivotally mounted about a vertical axis in such a manner as to contact the fruit or vegetable to be peeled.

Another spring (35) is provided for urging the blade supporting rod (8) towards the vegetable or fruit to be peeled so that the blade (20) at the remote end of the blade supporting rod (8) may engage the vegetable or fruit and peel the same while moving up or down depending on the direction in which the handle (3) is rotated.

Figure 9:
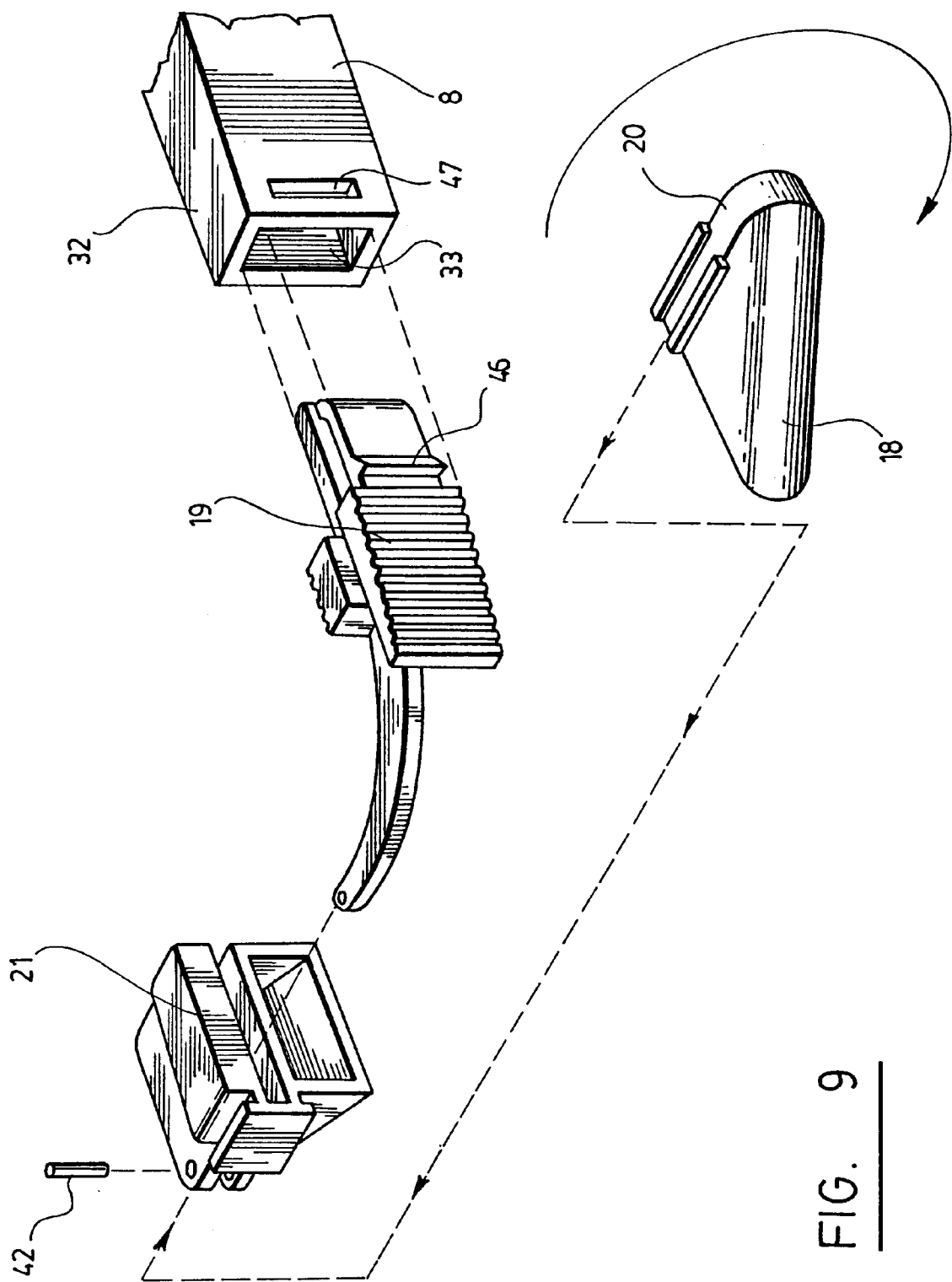
FIG. 9 is an exploded view of the cutting-peeling mechanism of the machine shown in the preceding Figures.
Figure 11:
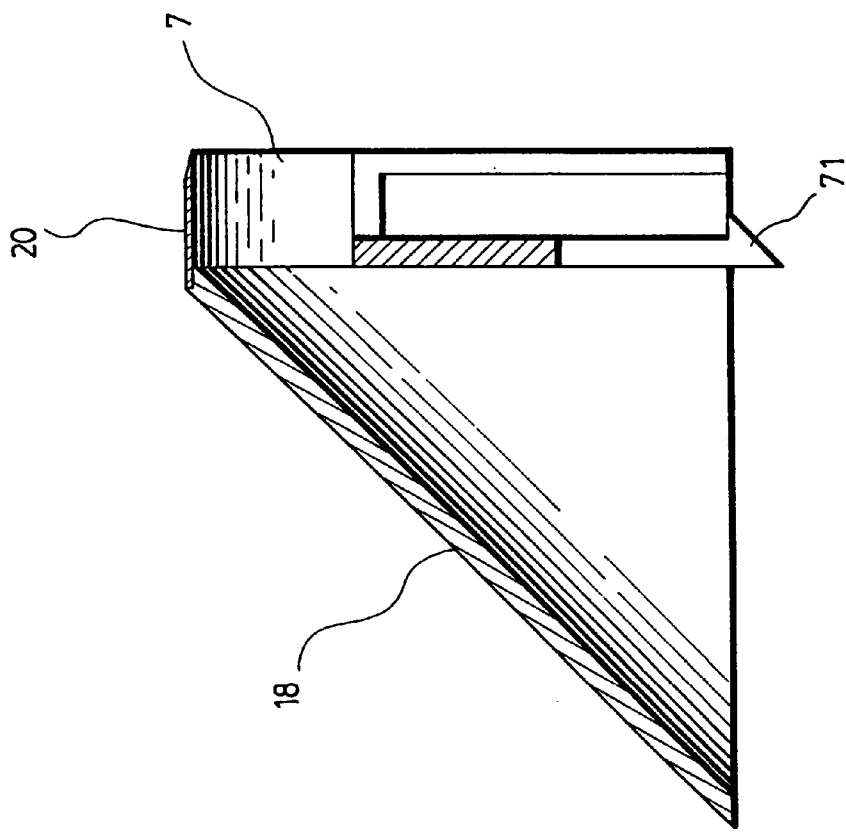
FIG. 11 is a side elevational cross-section view of the cutter head.
Figure 10:
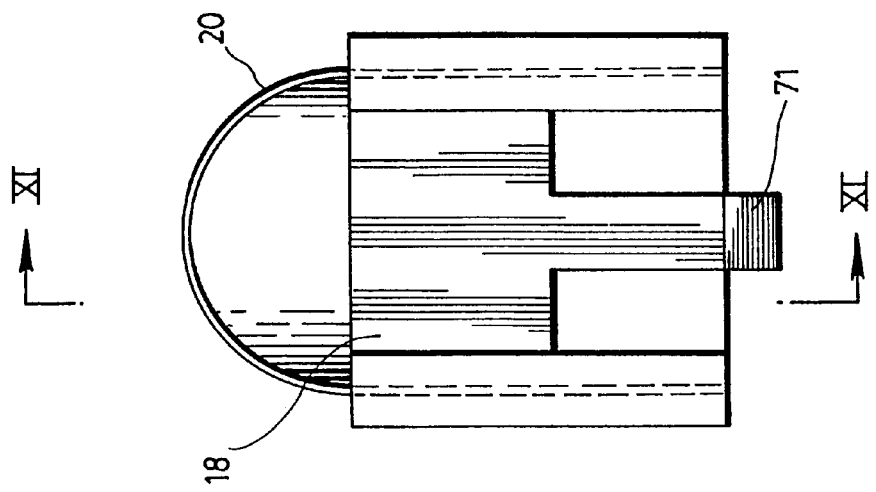
FIG. 10 is a front view of the cutter head of the mechanism shown in FIG. 10.
Figure 12:
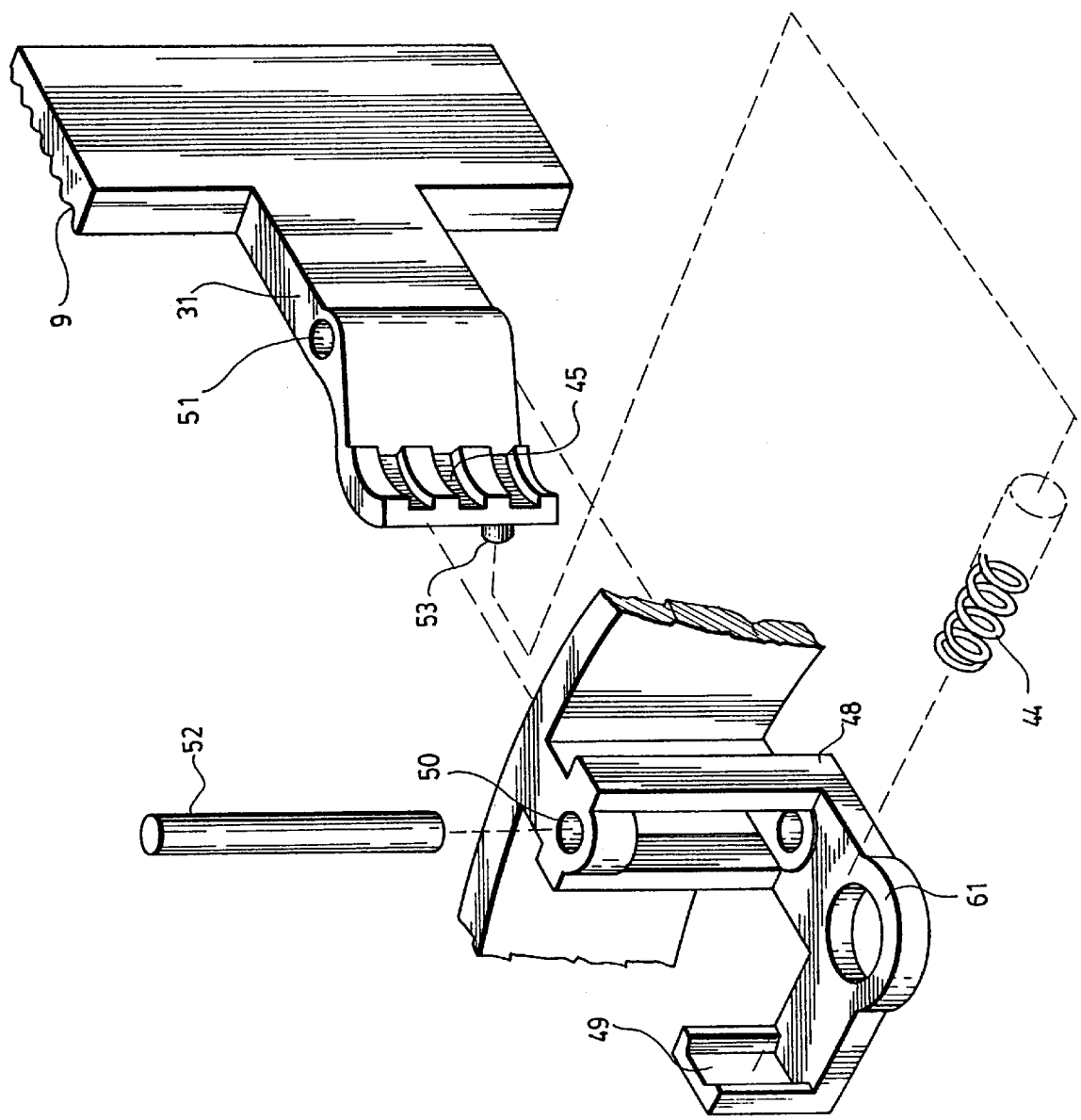
FIG. 12 is an exploded perspective view of the clutch arm, internal ring and supporting finger of the clutch device of the machine shown in the preceding Figures.

In the preferred embodiment illustrated in the accompanying drawings (see in particular FIGS. 9 and 10), the cutting/peeling device that is detachably mounted in the hole (33) at the remote end of the blade supporting rod (8), comprises a connecting element (19) having one end detachably mounted into the axial hole (33), and another opposite end. The one end of the connecting element is U-shaped when seen in horizontal cross-section and resilient enough to be pinched and snapped into the axial hole. The opposite end (43) of this connecting element is curved-shaped and projecting towards the vegetable or fruit to be peeled. Preferably, the U-shaped end of the connecting element (19) has flattened portions with corrugations thereon that extend outwardly of the axial hole (33) of the blade support rod (8) to facilitate installation and handling of this connecting element (19). Preferably also, the U-shaped end of the connecting element (19) also has a wedge (46) projecting laterally outwardly. This wedge is snappable into a corresponding opening (47) made into the remote end of the knife supporting rod (8). As is clearly shown in FIG. 9, the opening is preferably transversal to and intersecting the axial hole (33).

A cutter head holder (21) is pivotably mounted on the curved-shaped end of the connecting element (19). The holder (21) has a front corner and a pair of side walls hereinafter called "contact wall" and "support wall" that project perpendicular from each other and away for the front corner. It is pivotably mounted onto the connecting element (19) about a vertical pin (42) located within its front corner. In use, the contact wall of this holder (21) extends flat onto the vegetable or fruit to be peeled while its support wall extends perpendicularly thereto.

Preferably, the cutter head holder (21) is in the form of a block provided with an horizontal slot to give room to the curved-shaped end of the connecting element (19). Preferably also, the support wall of the cutter head holder (21) is provided with a set of horizontal retaining flanges on which the cutter head (18) may be slid and connected.

A cutter head (18) is detachably connected to the support wall of the cutter head holder (21). This cutter head (18) is of triangular shape when seen in top plan view and supporting the blade (20) at a short distance away from the contact wall, close to the support wall. Preferably, a resilient, finger-operated snap (71) can be provided onto the cutter head (18) to detachably lock it in proper position on the flanges of the cutter head holder (21). Preferably also, the blade (20) is U-shaped and has upper and lower branches connected to the cutter head (18).

Turning back to FIGS. 1 to 3, the vertical pole (5) is advantageously provided with a safety cam (10) having a bevelled upper edge (60). This safety cam (10) is located at the bottom end of the vertical pole (5) and projects vertically and outwardly so as to engage the knife supporting rod (8) and push it and the cutting/peeling device connected thereto away from the support axle (15) when the knife supporting rod (8) comes close to the base (13).

Figure 5:
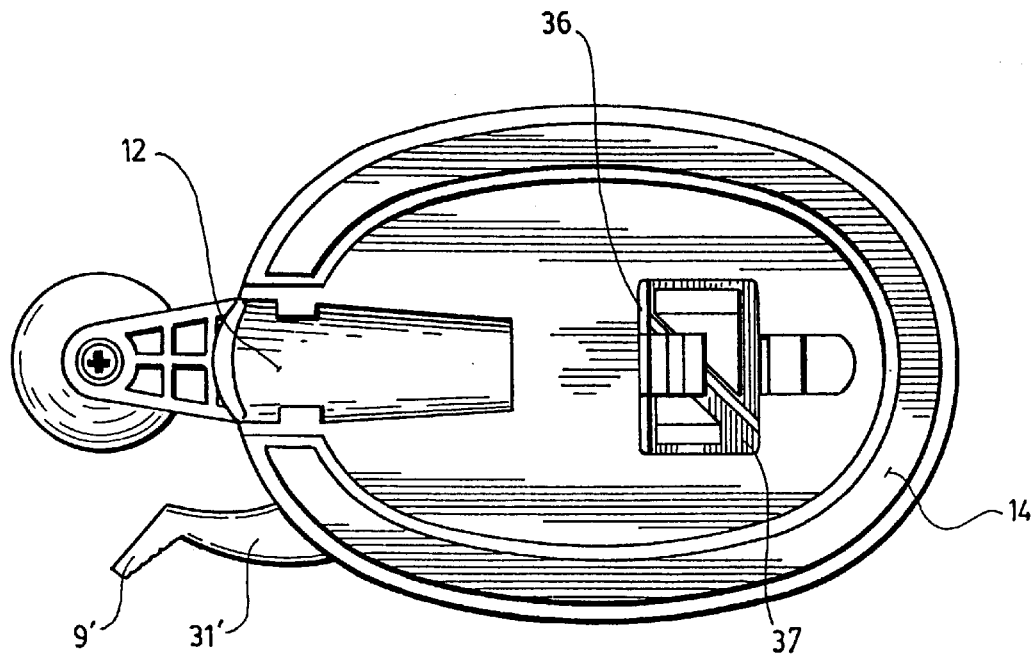
FIG. 5 is a bottom plan view thereof.

As is shown in FIGS. 4 and 5, the hollow base (13) advantageously includes a compartment (37) closed by a door (36). This compartment is sized to receive and store a plurality of substitute or replacement cutter heads similar to and interchangeable with the cutter heads (18) mounted on top cutting/peeling device. Each of the replacement cutter heads should, form a practical standpoint, be equipped with a blade adapted to a vegetable or fruit to be peeled.

Preferably also, a scooping-knife (12) may be sorted into a recess (34) provided in the hollow base (13). The scooping-knife (12) is preferably longitudinally tapering and curved in cross-section and the recess (34) in which the scooping-knife is stored, opens laterally outwardly from the base (13).

As is shown, the clutch actuating button (9), the disengaging button (9), the remote end of the support in pin rod (6) and the connecting element (19) of the blade supporting rod (8) preferably have corrugated outer surfaces to make grasping and handling of the machine easier for a user.

All the components of this machine, expect the threaded rod and the screws are preferably made of rigid plastic material. Such makes the machine light weight and easy to clean and maintain.

The machine disclosed hereinabove works as follows.

Figure 8:
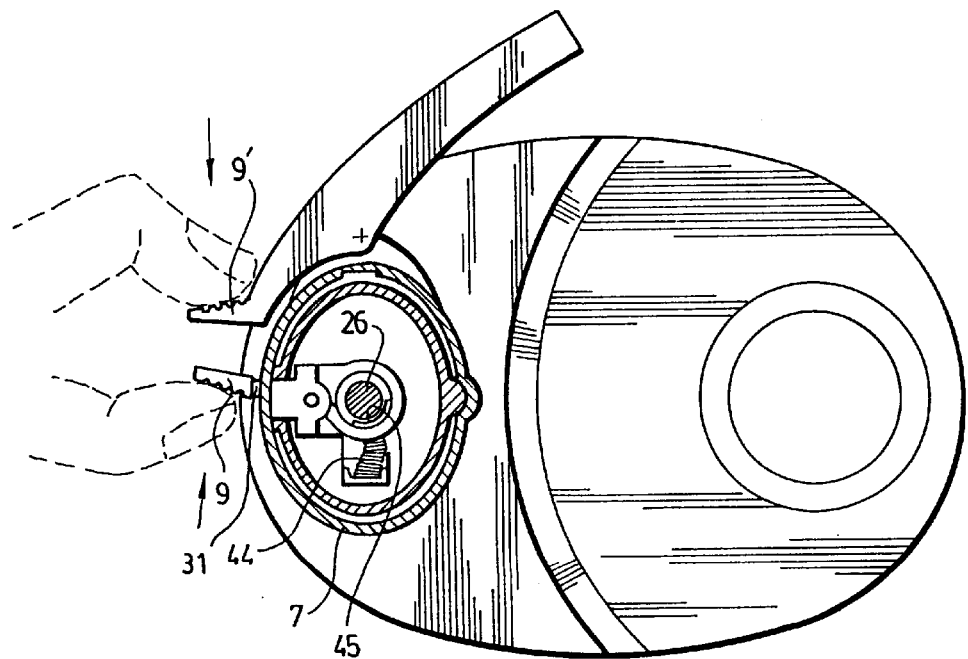
FIG. 8 is an horizontal cross-section view taken along line VIII—VIII of FIG. 3, showing the clutch arm disengaged from the threaded rod and the blade supporting arm in inoperative, turned-out position.

The fruit or vegetable to be peeled is positioned on top of the support axle (15) and pressed down on its pins. Then, the support pin rod (6) is manually moved down, so that its pin (40) penetrates the top of the fruit or vegetable and may hold it. The clutch buttons (9,9') are pinched with two fingers as shown in FIG. 8 in order to "free" the stand cover (7), and this cover (7) with the knife supporting rod (8) mounted on it is moved to the top of the fruit or vegetable. The clutch buttons (9,9') are released so that the clutch may connect the rod (26) and the blade (20) may come in contact with the fruit or vegetable to be peeled. Then, the handle (3) can be rotated.

Rotation of the threaded rod (26) is transmitted to the gear (23) which rotates in the same direction. The rotational movement is transmitted to the gear (24) through the gear (25). As a result, the fruit or vegetable engaged on the support axle (15) rotates while the handle is rotating. As the handle is rotated, the threaded rod (26) moves down the stand cover (7) and blade supporting rod.

During this motion, the cutter head holder (21) at the remote end of the blade supporting rod (8) is kept in operative position by the spring (35). As a result, the blade (20) engages and peels the skin of the vegetable or fruit from its top down to the lower part of the same, During all the operation, the contact wall of the cutter head holder (21) extends flat onto the vegetable or fruit to be peeled while the support wall extends perpendicular thereto.

When the knife support rod (8) reaches a level which corresponds to the height of the support axle (15), it engages the beveled upper edge (60) of the safety cam (10) and it is pushed out together with the cutting/peeling device connected thereto away from the support axle (15), thereby avoiding that the pins of the support axle (15) be damaged. Once the peeling is finished, the support pin rod (6) is manually moved up to allow recovery of the fruit or vegetable out from the support axle (15).

In the above description, it has been mentioned that the fruit or vegetable is peeled while the stand cover (7) and cutter head holder (21) move down. It should be understood however that the same result cold be obtained by moving up the stand cover (7) and associated elements, that is from the support axle (15) towards to the support pin rod (6).

As aforesaid, the machine according to the invention can be used to peel potatoes, beets, turnips, apples or pears. It can also be used to p eel other vegetables or fruits either with an empty interior or bearing seeds, such as cucumber. For such application, the middle insert pins (17) extends in the empty interior of the vegetable or fruit, while the external insert pins (16) on the rear side engage the lower part of the vegetable or fruit. In all cases, the vegetable or fruit is strongly affixed on the support axle (15) so that it may be rotated and regularly peeled without being damaged.

The scooping-knife (12) mentioned hereinabove is useful to remove the sprouts or tiny spots that may be left in the vegetable or fruit. After use, it can be put back into the recess (34) made for it in the hollow base (13). It is handy to use and may not get lost easily.

As aforesaid, the compartment (37) made in the bottom of the hollow base (13), is sized to receive and store a plurality of cutter heads similar to and interchangeable with the cutter head (18) mounted onto the cutting/peeling device. No tool is required for interchanging cutter heads, thereby making the machine very easy to use. Each of the substitute cutter heads is equipped with a blade and is of a size adapted to a given kind of vegetable or fruit to be peeled. Each cutter head (18) and the blade (20) mounted on it, form an integral structure that is detachably connectable to the cutter head holder (21) which is itself connected to the extremity of the curved-shaped end (43) of the connecting element (19) fixed to the blade supporting rod (8). As a result, the cutter head holder (21), the cutter head (18) and the blade (20) as a whole form a flexible tunable knife head which follows closely the skin of the fruit or vegetable. When the shape of the fruit or vegetable changes, the cutter head follows the contour of the fruit or vegetable while turning and it automatically adjusts to this contour so that it always remain close to the fruit or vegetable for peeling. In this way, good results are achieved in peeling any kind of fruits or vegetables, and in particular in peeling fruit or vegetables of irregular shapes or those fruits or vegetables weakened by scooping.

It is worth noting that the contact wall of the button head (18) which extends at an angle, increases the contact area with the upper and lower parts of the fruit or vegetable. As a result, the skins on these two parts can be peeled, thereby leaving behind less skin not yet peeled. Thus, the peeling effect is better.

As can be also appreciated, no tool is required for interchanging and adjusting the cutter heads. As can further be appreciated, the machine according to the invention is handy to use.

It will be apparent that many modifications may be made to the invention as disclosed hereinabove without departing from the scope of the appended claims.

We claim:

1. A machine for peeling vegetables and fruits, said machine comprising:

a hollow base (13);

a vertical pole (5) fixed to and projecting upwardly from the base (13), the vertical pole (5) having a top end with a cover (4) connected thereto, a side wall with a vertical slot made in it, and a bottom end;

a threaded rod (26) extending vertically within the vertical pole (5), the rod (26) having an upper end passing through a hole made in the cover (4) and a bottom end extending within the base;

a handle for driving the threaded rod (26) into rotation, the handle comprising a pole cork (22) that is positioned on top of the cover (4) and is connected to the upper end of the treaded rod (26), a handle rod (3) that is connected to and projects laterally away from the pole cork (22), the handle rod (3) having a remote end, and a handle knob (1) freely mounted for rotation about a vertical axis at the remote end of the handle rod (3);

a support pin rod (6) having one end slidably mounted onto the vertical pole (5) and a remove end which is located at a distance away from the vertical pole (5) and from which a pin projects downwardly to engage a vegetable or fruit to be peeled, said support pin rod (6) being slidably movable in a vertical plane along the vertical pole (5);

a support axle (15) rotatably mounted about a vertical axis on top of the base (13) at substantially the same distance away from the vertical pole (5) as the remote end of the support pin rod (6), the remote end of said support pin rod (6) and the support axle (15) being substantially aligned vertically, said support axle (15) having an upper surface from which a plurality of insert pins upwardly project to engage and support the fruit or vegetable to be peeled;

a set of gears (23,24,25) mounted within the base (13) and connected to the bottom end of the threaded rod (26) and to support axle (15) so as to drive said support axle (15) into rotation when the handle is rotated; and a cutting/peeling mechanism comprising:

a stand cover (7) in the form of an external ring slidably mounted onto the vertical pole (5);

a clutch device including a manually operable clutch arm (31) pivotally mounted on the stand cover about a vertical axis (50), said clutch arm (31) passing through the vertical slot (30) and having one threaded end (45) which is located within the vertical pole (5) and is operatively engageable with the threaded rod (26), and another end projecting outwardly from the vertical pole (5), said other end acting as a clutch actuating button (9);

a spring (44) for urging the one threaded end (45) of the clutch arm (31) towards the threaded rod (26);

a blade supporting rod (8) externally and pivotally mounted about another vertical axis on the stand cover (7), said blade supporting rod (8) projecting laterally away from the stand cover (7) and having a remote end (32) extending at substantially the same distance away from the vertical pole (5) as the remote end of the support pin rod (6), said remote end (32) having an axial hole (33), said blade supporting rod (8) also having an opposite end (9') acting as a disengaging button;

a cutting/peeling device detachably mounted into the hole (33) at the remote end (32) of the blade supporting rod (8), said device including a vertical blade (20) pivotably mounted about a vertical axis in such a manner as to contact the fruit or vegetable to be peeled; and another spring (35) for urging the blade supporting rod (8) towards the vegetable or fruit to be peeled so that the blade at the remote end of said blade supporting rod may engage said vegetable or fruit and peel the same while moving up or down.

2. The machine according to claim 1, wherein the cutting/peeling device also comprises:

a connecting element (19) having one end detachably mounted into the axial hole (33) at the remote end (32) of the blade support rod (8) and another opposite end, the one end of said connecting element being U-shaped when seen in horizontal cross-section and resilient enough to be pinched and snapped into the axial hole, the opposite end of said connecting element being curved-shaped and projecting towards the vegetable or fruit to be peeled;

a cutter head holder (21) having a front corner and a pair of side walls hereinafter called "contact wall" and "support wall" that project perpendicularly from each other and away from the front corner, said cutter head holder (21) being pivotably mounted on the curved-shaped end of the connecting element (19) about a vertical pin (42) located within said front corner, whereby, in use, said contact wall extends flat onto the vegetable or fruit to be peeled and said support wall extends perpendicularly thereto; and a cutter head (18) detachably connected to the support wall of the cutter head holder (21), said cutter head (18) being of triangular shape when seen in top plan view and supporting said blade (20) at a short distance away from the contact wall, close to the support wall.

3. The machine according to claim 2, wherein:

the U-shaped end of the connecting element (19) has flattened portions with corrugations thereon that extend outwardly of the axial hole (33) of the blade support rod (8) to facilitate installation and handling of said connecting element (19);

the U-shaped end of the connecting element (19) also has a wedge (46) projecting laterally outwardly, said wedge being snappable into a corresponding opening (47) made into the remote end of the knife supporting rod (8), said opening being transversal to and intersecting the axial hole (33);

the cutter head holder (21) is in the form of a block provided with an horizontal slot to give room to the curved-shaped end of the connecting element (19);

the support wall of the cutter head holder (21) is provided with a set of horizontal retaining flanges on which the cutter head (18) may be slid and connected;

resilient, finger-operated snap (71) is provided onto the cutter head (18) to detachably lock it in proper position on the flanges of the cutter head holder (21); and the blade (20) is U-shaped and has upper and lower branches connected to the cutter head (18).

4. The machine according to claim 3, wherein the vertical pole (5) is provided with a safety cam (10) having a bevelled upper edge (60), said safety cam (10) being located at the bottom end of said vertical pole (5) and projecting vertically and outwardly so as to engage the knife supporting rod (8) and push it and the cutting/peeling device connected thereto away from the support axle (15) when said knife supporting rod (8) comes close to the base (13).

5. The machine according to claim 3, wherein the base (13) has a bottom surface provided with an anti-skid rubber pad (14) and said base includes a compartment (37) closed by a door (36), said compartment being sized to receive and store a plurality of replacement cutter heads similar to and interchangeable with the cutter heads (18) mounted onto cutting/peeling device, each of said replacement cutter heads being equipped with a blade adapted to a vegetable or fruit to be peeled.

6. The machine according to claim 3, wherein the clutch actuating button (9), the disengaging button (9'), the remote end of the support pin rod (6) and the connecting element (19) of the blade supporting rod (8) have corrugated outer surfaces to make grasping and handling of the machine easier for a user.

7. The machine according to claim 3, wherein the insert pins on the upper surface of the support axle (15) include a set of central pins (17) and a set of external insert pins (16), the pins of each said sets being equally spaced apart.

8. The machine according to claim 7, wherein the central pins (17) are of elongated conical shape, the external pins (16) are of triangular shape and extend in radial elongated planes with respect to the vertical axes of the support axle, and the central and external pins are offset with respect to each other.

9. The machine according to claim 8, wherein the support axle is cylindrical in shape and supports four of said central insert pins (17) and four of said external insert pins (16).

10. The machine according to claim 9, wherein the upper surface of the support axle (15) is concave.

11. The machine according to claim 3, wherein said machine further comprises a scooping-knife (12) stored into a recess (34) provided in the hollow base (13).

12. The machine according to claim 11, wherein the scooping-knife (12) is longitudinally tapering and curved in cross-section and the recess (34) in which said scooping-knife is stored, opens laterally outwardly from the base.

13. The machine according to claim 3, wherein the stand cover (7) comprises:

an internal ring (61) slidably mounted onto the threaded rod (26), said internal ring being integrally connected to the external ring via a bridge (48) passing through the vertical slot (38) of the vertical pole (5), and a supporting finger (49) integrally connected to said internal ring, said supporting finger (49) extending within the vertical pole and supporting the spring (44) for urging the one threaded end (45) of the clutch arm (31) towards the threaded rod (26).

14. The machine according to claim 13, wherein vertical pole (5) is provided with a safety cam (10) having a bevelled upper edge (60), said safety cam (10) being located at the bottom end of said vertical pole (5) and projecting vertically and outwardly so as to engage the knife supporting rod (8) and push it and the cutting/peeling device connected thereto away from the support axle (15) when said knife supporting rod (8) comes close to the base (13).

15. The machine according to claim 14, wherein:

the insert pins on the upper surface of the support axle (15) include a set of central pins (17) and a set of external insert pins (16), the pins of each of said sets being equally spaced apart; and the central pins (17) are of elongated conical shape, the external pins (16) are of triangular shape and extend in radial elongated planes with respect to the vertical axes of the support axle, and the central and external pins are offset with respect to each other.

16. The machine according to claim 15, wherein:

the base (13) has a bottom surface provided with an anti-skid rubber pad (14) and said base includes a compartment (37) closed by a door (36), said compartment being sized to receive and store a plurality of replacement cutter heads similar to and interchangeable with the cuter heads (18) mounted onto cutting/peeling device, each of said replacement cutter heads being equipped with a blade adapted to a vegetable or fruit to be peeled; and said machine further comprises a scooping-knife (12) stored into a recess (34) provided in the base (13).

17. The machine according to claim 1, wherein the vertical pole (5) is provided with a safety cam (10) having a bevelled upper edge (60), said safety cam (10) being located at the bottom end of said vertical pole (5) and projecting vertically and outwardly so as to engage with the knife supporting rod (8) and push it and the cutting/peeling device connected thereto away from the support axle (15) when said knife supporting rod (8) comes close to the base (13).

18. The machine according to claim 1, wherein:

the insert pins on the upper surface of the support axle (15) include a set of central pins (17) and a set of external insert pins (16), the pins of each of said sets being equally spaced apart; and the central pins (17) are of elongated conical shape, the external pins (16) are of triangular shape and extend in radial elongated planes with respect to the vertical axes of the support axle, and the central and external pins are offset with respect to each other.

19. The machine according to claim 1, wherein:

the base (13) has a bottom surface provided with an anti-skid rubber pad (14) and includes a compartment (37) closed by a door (36), said compartment being sized to receive and store a plurality of replacement cutter heads similar to and interchangeable with the cuter heads (18) mounted onto cutting/peeling device, each of said replacement cutter heads being equipped with a blade adapted to a vegetable or fruit to be peeled; and said machine further comprises a scooping-knife (12) stored into a recess (34) provided in the hollow base (13).

20. The machine according to claim 1, wherein the stand cover (7) comprises:

an internal ring (61) slidably mounted onto the threaded rod (26), said internal ring being integrally connected to the external ring via a bridge (48) passing through the vertical slot (38) of the vertical pole (5), and a supporting finger (49) integrally connected to said internal ring, said supporting finger (49) extending within the vertical pole and supporting the spring (44) for urging the one threaded end (45) of the clutch arm (31) towards the threaded rod (26).

\* \* \* \* \*